United States Patent [19]
Bingham

[11] Patent Number: 5,676,513
[45] Date of Patent: Oct. 14, 1997

[54] ROUND BALE LOADING AND UNLOADING TRAILER

[76] Inventor: Harold L. Bingham, 125 Charlie Norris Rd., Richmond, Ky. 40475

[21] Appl. No.: 775,600

[22] Filed: Dec. 31, 1996

[51] Int. Cl.$^6$ ................................................. A01D 90/00
[52] U.S. Cl. .................... 414/24.5; 414/111; 414/502; 414/528
[58] Field of Search .......................... 414/24.5, 111, 414/789.7, 502, 528

[56] References Cited

U.S. PATENT DOCUMENTS

| | | | |
|---|---|---|---|
| 2,756,887 | 7/1956 | Raney et al. | 414/502 |
| 3,421,647 | 1/1969 | Seymour | 414/502 |
| 4,050,598 | 9/1977 | Schurz . | |
| 4,084,707 | 4/1978 | McFarland . | |
| 4,182,590 | 1/1980 | Harkness | 414/24.5 |
| 4,268,199 | 5/1981 | Fontrier | 414/111 |
| 4,282,969 | 8/1981 | Zipser | 414/502 |
| 4,329,102 | 5/1982 | Gray | 414/24.5 |
| 4,443,146 | 4/1984 | Duncan . | |
| 5,074,733 | 12/1991 | Hennig | 414/24.5 |
| 5,316,431 | 5/1994 | Barber . | |

FOREIGN PATENT DOCUMENTS

| | | | |
|---|---|---|---|
| 2400830 | 4/1979 | France | 414/24.5 |
| 1574129 | 9/1980 | United Kingdom | 414/111 |

*Primary Examiner*—Karen B. Merritt
*Assistant Examiner*—Douglas Hess
*Attorney, Agent, or Firm*—Sughrue, Mion, Zinn, Macpeak & Seas, PLLC

[57] ABSTRACT

A ground engaging wheeled trailer includes an elongated chassis having a horizontal deck overlying an upright rolled, hair pin shaped I-beam track including a horizontal section extending the length of the deck, an integral vertical section extending downwardly at the rear of the deck, and an integral, forwardly and upwardly inclined third section. A plurality of cars are mounted for movement on the track by car wheels engaging opposite side recesses within the I-beam track. Each car includes a hinged plate at a radially outboard position on the car. A U-shaped cam follower yoke is fixedly mounted to a spear adjacent the hinged plate and carries cam follower rolls to opposite sides thereof for engaging with respective camming bars to opposite sides of the track third sections. Cam slots formed by spaced camming rails forward of the track third section cause the hinged plates to pivot to a position such that the spears carried thereby are horizontal and generally parallel to the longitudinal axis of the cars. The cars are fixedly coupled to a chain at longitudinally spaced positions over the length of the car corresponding to desired spacing of the impaled round hay bales on the trailer deck.

10 Claims, 4 Drawing Sheets

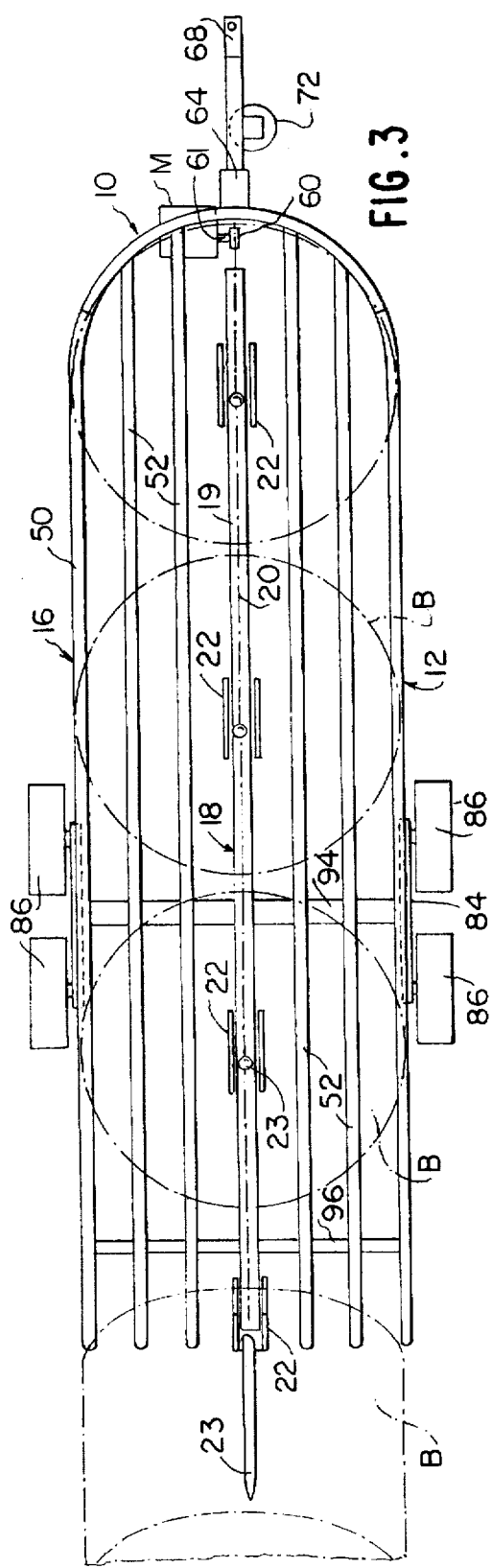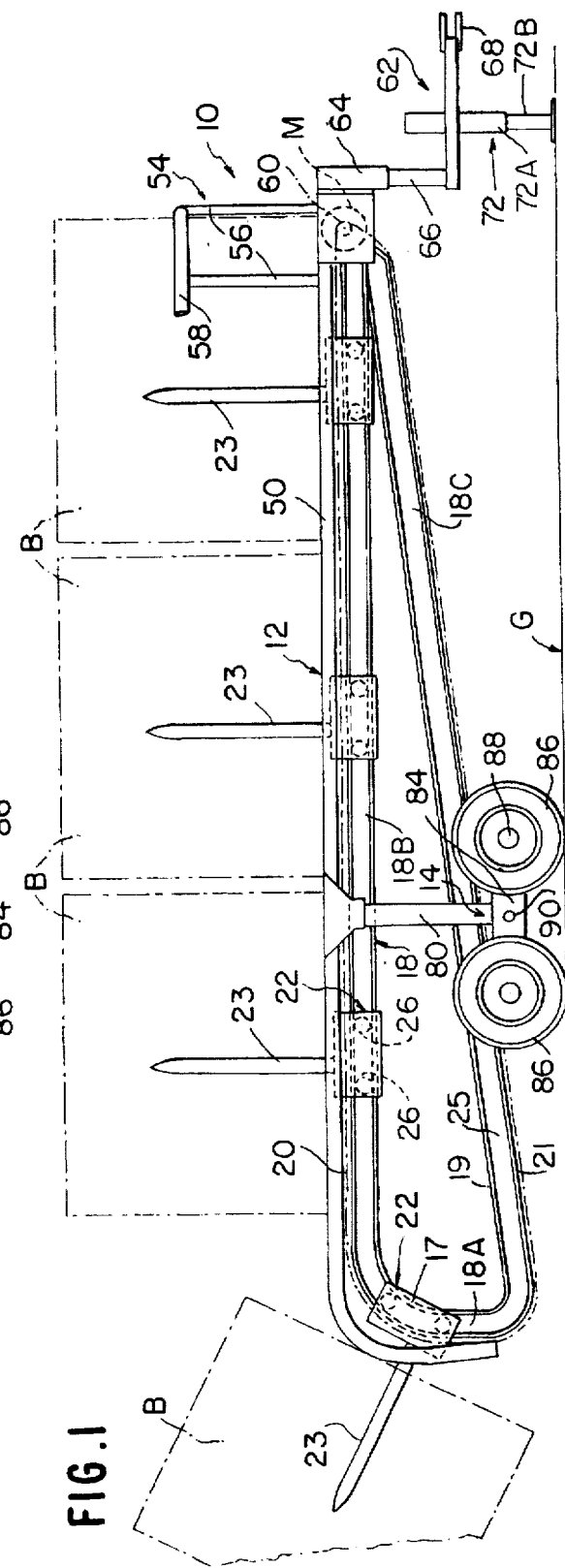

ROUND BALE LOADING AND UNLOADING TRAILER

FIELD OF THE INVENTION

The present invention relates to round bale loading and unloading trailers, and more particularly to cam operated cars fixed to an endless roller chain carried by a trailer bed for properly maintaining the orientation of a spear carried by each car for permitting the spear to initially penetrate the center of a round hay bale, and for then to rotate 90° the bale in moving up and over the rear of the trailer bed, and for moving the loaded round bale longitudinally over the bed for sequential stacking of multiple round bales at longitudinal adjacent positions on the trailer bed, and for reverse unloading of the bale sequentially from the trailer.

BACKGROUND OF THE INVENTION

Large round bales of hay have developed in recent years which are generally cylindrical in shape approximately four to six feet in diameter and weighing in excess of a thousand pounds. Loading such round bales is accomplished by mechanical equipment since such large bales cannot be handled by even several persons.

U.S. Pat. No. 4,050,598 issued Sep. 27, 1977 to James L. Schurz and entitled "BALE WAGON" is directed to a bale wagon for loading, unloading and transporting round bales of hay. A wheel mounted bale supporting frame supports a bale loading means pivotally mounted to the frame at a front end, such means constituting a pair of forks or tines which are projected beneath the bale while on the ground, with the bale axis horizontal and the tines are rotated 90° to tilt their axes vertically and to cause the bottom of the vertically upright cylindrical hay bale to engage an endless conveyor carried by the bale wagon, with the endless conveying chain shifting the round hay bales sequentially towards the rear end of the wagon.

U.S. Pat. No. 4,084,707 issued Apr. 18, 1978 to Douglas McFarland and entitled "ROUNDBALE LOADING AND UNROLLING MACHINE" teaches, in one form, a round bale trailer including a conveyor extending the length of the trailer, with a loading and unrolling machine mounted at a rear end of the trailer. The unrolling machine includes a pointed spindle pivotal between a rearwardly extending loading position capable of impinging the round hay bale at its center and a second position 180° therefrom to place the hay bale onto the top of the conveyor where the conveyor moves a series of such loaded bales forwardly in the direction of the front of the trailer. Operation of the conveyor causes the disengagement of the impinged bale from the spindle, while operation in the opposite direction reimpales the bale on the spindle. Rotation of the spindle about its axis with the reloaded bale directed rearwardly of the trailer causes unrolling of the hay from the bale and dispersion of the unrolled hay while the trailer is being moved forwardly during such unrolling operation.

While such machines as exemplified by the patents described above operate with some degree of reliability, the conveyor system carried by the trailer or wagon is separate from that of the loading and unloading mechanism, and in the case of the round bale loading and unrolling machine of U.S. Pat. No. 4,084,707, the hay bale loading and unloading and unrolling machine takes up a significant portion of the trailer itself and limits the number of round hay bales which can be stacked on the trailer for transport after loading.

It is therefore an object of the invention to provide an automatic loading and unloading machine for round hay bales, which is integral with the conveyor system, which precisely stacks round hay bales in sequence on the conveyor keyed to the diameter round bales, which may be loaded or unloaded from a pickup or tractor seat, which is designed both for farm and highway bale transport, which operates on hydraulic or twelve volt DC power, and which is of low cost and highly reliable.

SUMMARY OF THE INVENTION

A round bale loading and unloading trailer of the present invention includes a chassis or bed of tubular steel construction riding on dual pairs of ground engaging wheels, to respective opposite chassis sides and proximate to the rear of the chassis. The tubular steel bed carries a longitudinally extending, rolled I-beam which creates a continuous loop for supporting an endless roller chain about the periphery of the I-beam loop. A plurality of cars of open frame construction bearing guide wheels engage opposite sides of the I-beam which forms a pair of tracks for guiding the cars. The cars are fixedly mounted to the roller chain at spaced longitudinal positions correlated to the diameter of the round hay bales. Each car supports an elongated pointed spear which is fixed to a plate which hinged to the open frame car. The configuration of the I-beam loop includes a vertical upright portion at the rear of the bed continuing into a top horizontal portion from the rear to the front of the bed, and a third downwardly and rearwardly oblique portion from a driven sprocket at the front of the bed back to the lower end of the vertical portion at the rear of the bed. A cam follower yoke is mounted externally of each car including a base between laterally spaced arms which engages the base of the spear, with the arms of the yoke extending away from the base and the spear and bearing cam follower rolls at outboard ends which engage respective cam rails. The cam rails extend parallel to the downwardly and rearwardly oblique portion of the rolled I-beam to maintain the spears generally horizontal and above ground as the spears move on the respective cars from the front of the trailer to the rear. At the rear of the trailer, a pair of arcuate cam rails on opposite sides of the I-beam define cam slots which receive the cam follower rollers to maintain the spear in its horizontal, rearwardly projected position, permitting each spear to penetrate the center of a round hay bale and to carry each hay bale during further rotation of the chain onto the top of the steel tube bed or deck, with the spear pivoting from a horizontal position to vertical upright position, maintaining engagement with the bale and ensuring proper spacing sequentially of the bales in a tight roll over the full length of the bed. Reversal of the endless conveyor chain causes unloading sequentially of the bales, which upon contact with the ground separate from the impaling spears of respective cars. Once loaded, the round hay bales may be transported to a storage area, feed area or market as desired.

BRIEF DESCRIPTION OF THE DRAWINGS

FIG. 1 is a schematic, side elevational view of a round hay bale loading and transport trailer during bale loading forming a preferred embodiment of the invention.

FIG. 3 is a top plan view of the trailer of FIG. 1.

DESCRIPTION OF THE PREFERRED EMBODIMENT

Figure 4:
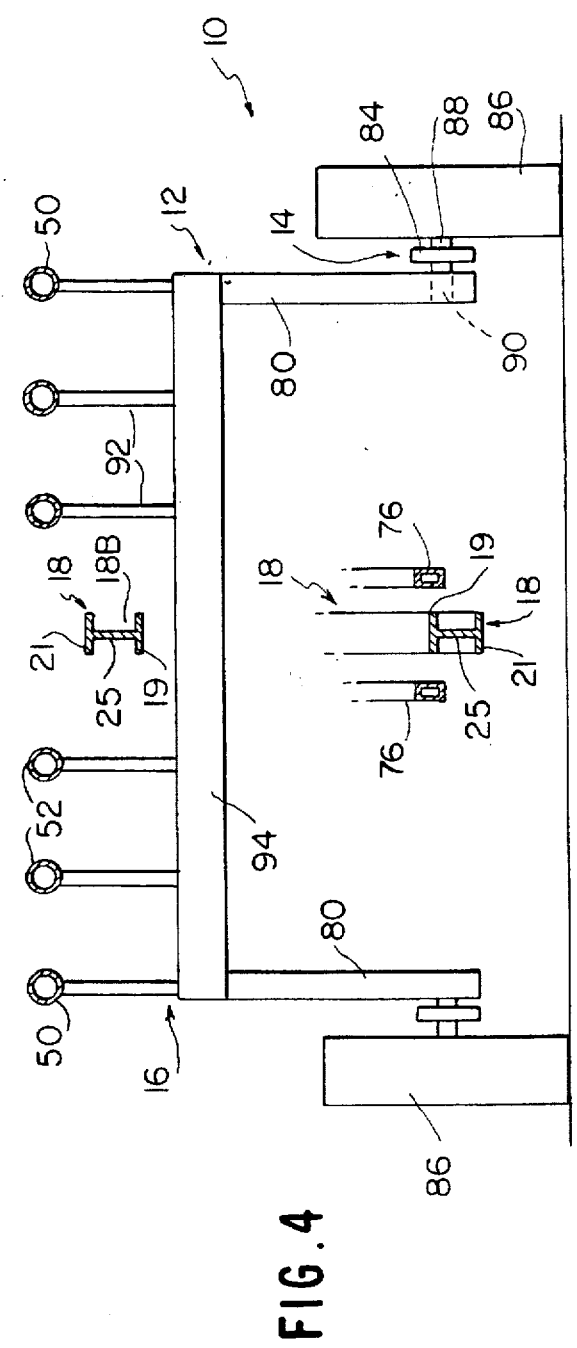
FIG. 4 is a vertical sectional view of a portion of the trailer of FIG. 2, taken about line 4—4.

Referring to the drawings, it may be appreciated that the round hay bale loading and transport trailer constitutes a fully automated machine which integrates the loading and unloading aspect with that of sequentially stacking the round bales of hay on the bed of the trailer in a single row. As such, the hay bales are impaled by spears mounted on cars or carriers which are fixedly coupled to an endless chain and which move on an endless loop track, with the cars stored beneath the bed above the ground so as not to interfere with trailer movement either forwards or backwards. The cars are moved sequentially into one position where the spear extends horizontally and in line with the axis of a bale to be impaled and from that position to a vertically upright position on the top of the trailer bed with controlled shifting orientation of the spears from horizontal to vertical to effect a first sequence of operations in loading of the bales on the bed in a side-by-side, axial upright position in a single row until the tractor is loaded. By reverse movement of the cars simultaneously in the opposite direction, the bales are unloaded from the trailer. In loading the bales, the trailer itself is driven rearwardly to force the spear to impale the center or axis of a bale aligned therewith and resting on the ground. Each car bearing the speared bale moves on the track by operation of the endless chain such that the spear and bale are hoisted upwardly onto the deck from a horizontal axis orientation to a vertical axis orientation, while a second car carried spear is aligned with the axis of a second bale for similar impaling. The operational sequence is continued for the remaining cars.

Figure 9:
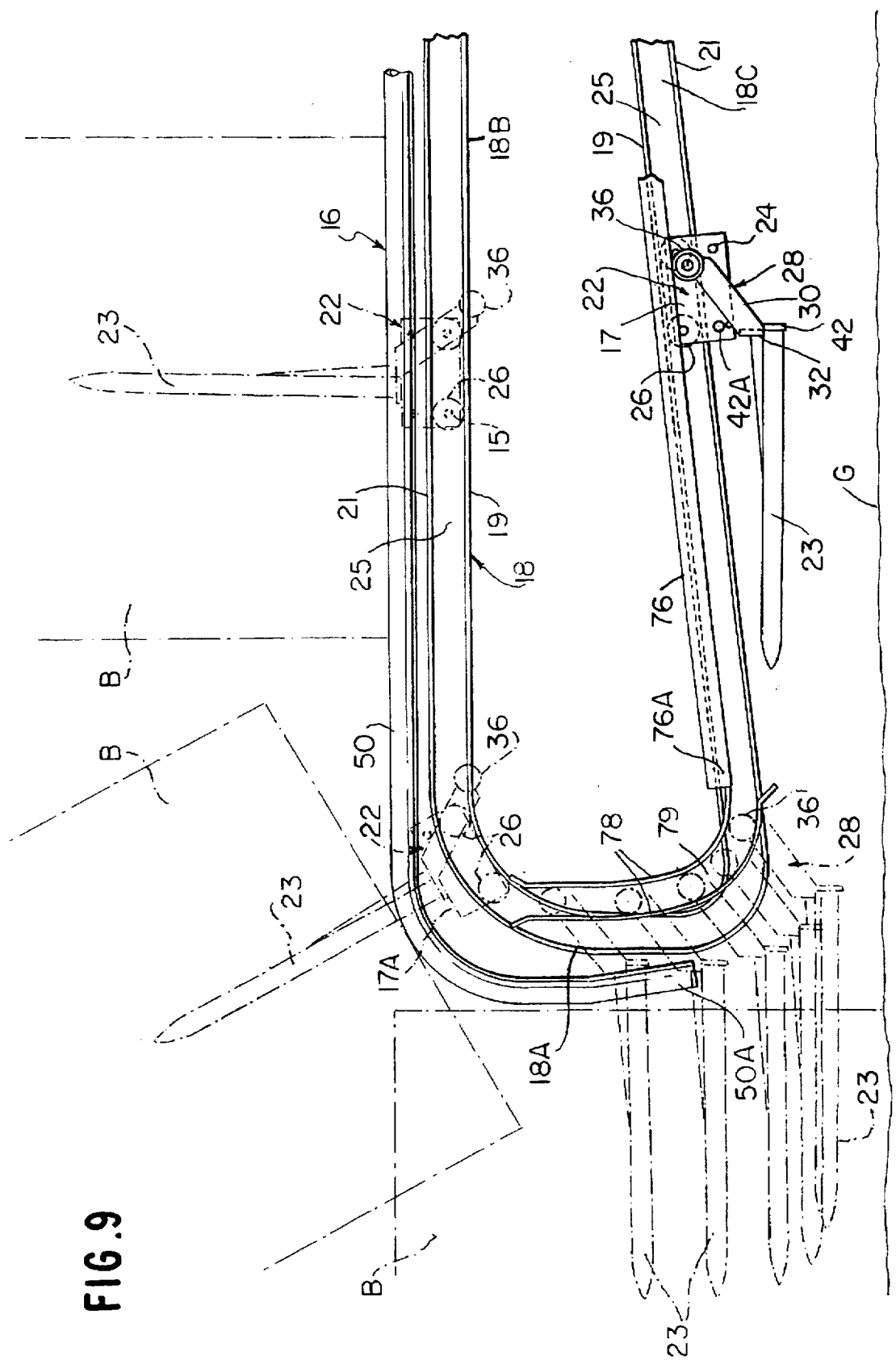
FIG. 9 is an enlarged side elevational view of the I-beam car track in the vicinity of the rear end of the trailer showing the transition of the cars and the cam actuated, controlled shifting position of a spear carried by each car from a lower oblique section of the rolled I-beam track through a vertical upright section at the rear of the trailer and into a horizontal track section extending adjacent to and parallel with the deck of the trailer.

FIG. 1 shows the round hay bale loading and transport trailer after loading of four round bales B onto the trailer indicated generally at 10. The trailer 10 consists of a chassis indicated generally at 12, which, as seen in FIG. 3, is provided with two, dual axle wheel assemblies 14 to respective sides of the trailer 10. The chassis includes an open frame deck or bed of tubular steel members, indicated generally at 16, and consisting principally of an U-shaped outer deck tube 50 which is rounded at the front of the trailer and to which is welded a series of longitudinally extending, straight and parallel deck alignment rails 52, FIG. 3, which overlie a wheel assembly mounting crossbar 94 and a further crossbar 96 to the rear thereof. The deck 16 is therefore of open frame construction, being lightweight but rigid and having the strength to support the large diameter bales B, each of which may be in excess of a thousand pounds or more. A principal feature of the present invention is the utilization of a unitary hair pin shaped, rolled I-beam car track 18 which is mounted beneath the deck 16, which forms oppositely directed U-shaped endless cavities on opposite sides of the car carrying track 18 facilitating the mounting of individual spear carrying cars 22 on the track 18. The cars are sequentially movable between a vertically upright first section of the track 18A at the rear of the vehicle, a horizontal second section 18B of the track, extending from the rear of the deck 16 to the front and an integral, downwardly and rearwardly oblique, straight third section 18C. These sections define roughly a right triangle with rounded corners at the rear and at the apex, where sections 18B and 18C intersect. While the track 18 is formed of a rolled I-beam, it should be apparent that such track may be formed other than using a steel I-beam. Further, the open hair pin shaped track may open at the front end or closed end and take other forms such as being of rectangular form. It is necessary that the rear of the trailer be provided with a vertical track section similar to that at 18A to ensure that the spear 23 of each car or carrier be oriented in a horizontal position and at a height approximately equal to the radius of a round hay bale such as that at B to effect axial penetration of the spear into the center of the hay bale by reverse drive movement of the trailer 10. The trailer 10 may be driven by a tractor or other prime mover to effect proper impalement of the hay bale and to permit the raising of the hay bale as impaled on the spear from the ground while rotating the bale 90° into a vertically upright position as shown in the sequence as depicted in FIG. 9. Not only does the rolled hair pin shaped I-beam spear carrier track 18 function to support for movement along the track of a plurality of cars 22, but additionally the outer peripheral wall of the I-shaped cross-section track 18 acts as a guide for an endless loop roller chain 20, FIG. 1, which chain 20 has fixedly attached thereto, at equally spaced positions, four cars 22 in the illustrated embodiment as depicted in that figure and the other drawing figures. The car spacing shown in the drawings is for bales B of six-foot diameter. Conventionally, such bales come in other sizes such as bales having a diameter of four feet. The spacing of the cars 22 along the chain can be varied so that for smaller bales the cars are closer together while maintaining a slight gap between bales B such as that depicted in FIG. 1. In the schematic drawings, the roller chain 20 is shown as being in engagement with a motor driven sprocket 60, which is fixed to the outboard end of a drive shaft 61, projecting from a combined hydraulic and electric motor assembly M. As such, the sprocket 60 may be driven reversibly by hydraulic fluid from a farm tractor via a hydraulic motor section, or alternatively through a 16 V D.C. electric motor section by batteries or via an electric generator of the prime mover for the system. The spacing of the cars 22 ensures proper maintenance in position of the endless chain 20 in contact with or positioned above the outer peripheral surface 21 of the rolled hair pin shaped I-beam spear carrier track 18. If necessary, guides (not shown) may be intermittently fixed to the side edges of the radially outer wall 21 of the I-beam track 18 in a manner to maintain the chain on the track 18, while not to interfere with unrestricted movement of the cars 22 over the three track sections, selectively reversibly back and forth from the position shown in FIG. 1 to the car stored positions shown schematically in FIG. 2.

The open frame construction of the chassis 12 may be further appreciated by reference to FIG. 4, which shows wheel assembly mounting crossbar 94 as extending from one side of the deck 16 to the other. At each end of the crossbar 94, there depends a vertical post 80 which carries at its lower end a pivot frame axle 90, FIG. 2, about which swivels an elongated pivot beam 84. Beam 84 carries, at opposite ends, dual wheels, respectively, at 86. The pivot frame axle 90 permits the mounting of a pivot beam 84 between the post 80 and the dual wheels 86. The wheels, in turn, are pivotally mounted by way of wheel axles 88 to respective opposite ends of the pivot beam 84. This permits the pivot beam 84 to pivot slightly on the pivot frame axle 90 to compensate for raising and lowering of the front and of the trailer 10.

A plurality of risers 92 welded to the top of crossbar 94 support the outer U-shaped tubular frame member 50 and the inner frame alignment rails 52. The section 18B of the hair pin shaped rolled I-beam spear carrier track is mounted on the chassis 12 above the crossbar 94 and the downwardly and rearwardly oblique portion 18C extends beneath the same, FIG. 4. In the schematic representation of the drawings, certain of the open frame content has been eliminated for simplicity purposes. It should be understood that the closed loop track 18 is supported by the deck 16 through the various crossbars 94, 96 and other chassis components (not shown) The track is maintained in vertically upright position.

Figure 2:
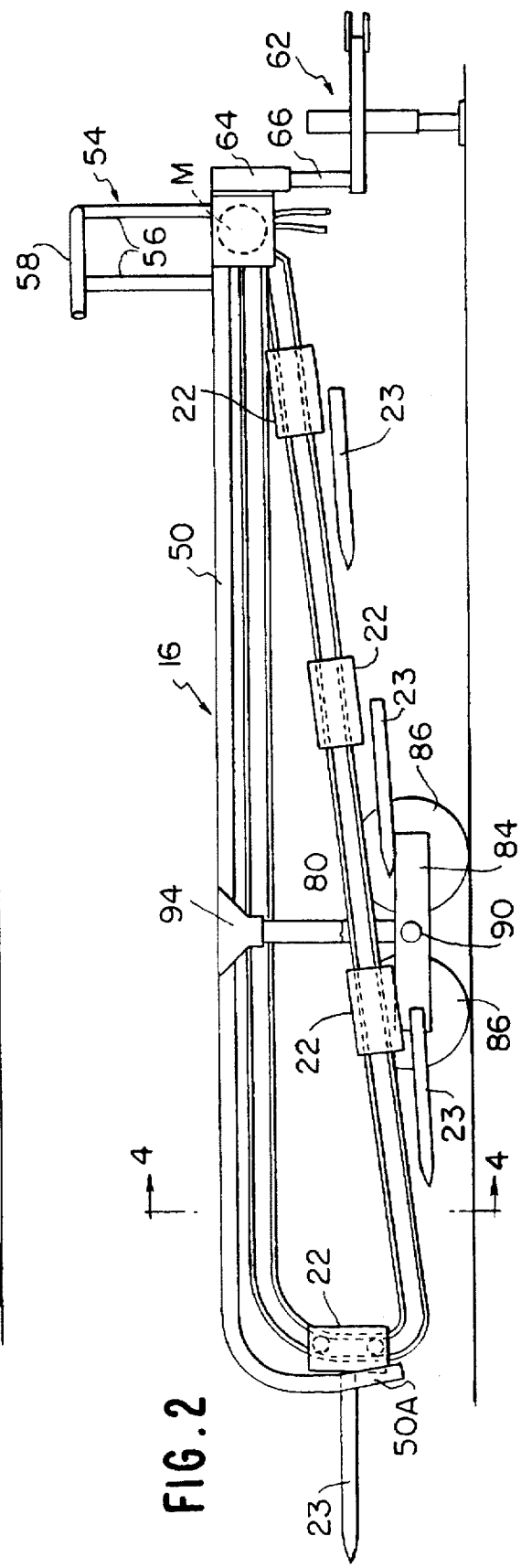
FIG. 2 is a schematic side elevational view of the trailer of FIG. 1 prior to bale loading with a plurality of spear supporting cars retracted into underlying or stored positions beneath the bed of the trailer.

As seen in FIGS. 1 and 2, an upright load stop indicated generally at 54 is integrated to the deck 16 at the front of the trailer, being formed of a plurality of risers 56 which are welded at their lower ends to the U-shaped outer frame member 50 and which in turn are welded at upper ends to a U-shaped top rail 58. The front of the first loaded bale B, FIG. 1, rests against the upright load stop 54.

Figure 5:
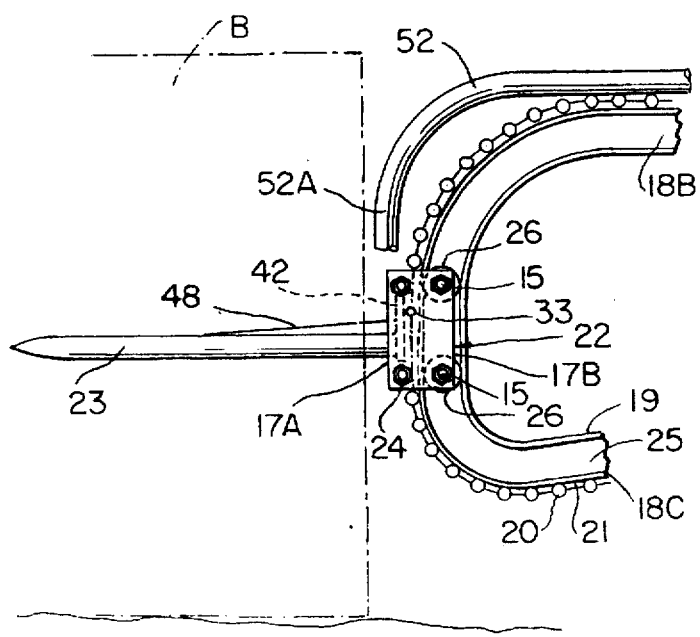
FIG. 5 is an enlarged side view, partially broken away, of a vertical section of the rolled, hairpin shaped I-beam car track forming a principal component of the present invention.
Figure 6:
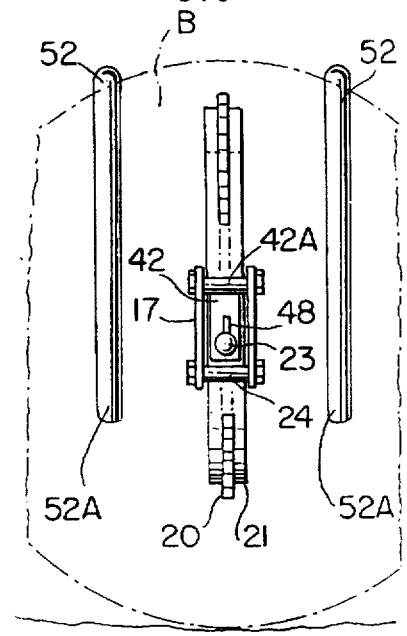
FIG. 6 is a front elevational view of the portion of the trailer shown in FIG. 5.

While the drawing FIGS. 1 and 2 depict the main components of the round hay bale loading and transport trailer with two different orientations of the spears 23 relative to the cars 22 carrying the same, drawing FIGS. 5–9 show the details of the automatic mechanism for shifting the position of each spear 23 relative to its car 22 from a horizontal, generally in-line position as per FIG. 2 prior to the loading of the trailer to a vertically upright position with respect to those cars 22 as per FIG. 1, after the spears impale the center or axis of respective bales B. FIGS. 5 and 6 illustrate in a side elevational view, partially broken away, and in a front view, respectively, the makeup of the cars 22 and the hinged plate mounting of the spears 23 carried by those cars 22. Each car 22 is of rectangular parallelepiped form, consisting essentially of laterally opposed sidewalls 17, which are spaced apart and maintained in positions at a width in excess of that of track 18 by suitable bolts indicated at 24. Each sidewall 17 has an outer edge 17A and an opposite, inner side edge 17B. Proximate to the inner side edge 17B are mounted on respective sidewalls 17 a pair of guide wheels 26 for rotation about their axes on axles 15. The axles are stub axles terminating at the rollers 26 and being spaced apart on respective sides of the I-beam track 18, a distance in excess of the thickness of the vertical wall 25 between the radially outer wall 21 and the radially inner wall 19 of the hair pin shaped, rolled, I-beam car track 18. Thus, on each car 22, the four car guide wheels are carried within the deep cavities or recesses to opposite sides of the track 18, with the periphery of wheels 26 contacting respective opposed facing surfaces of walls 19, 21.

Figure 7:
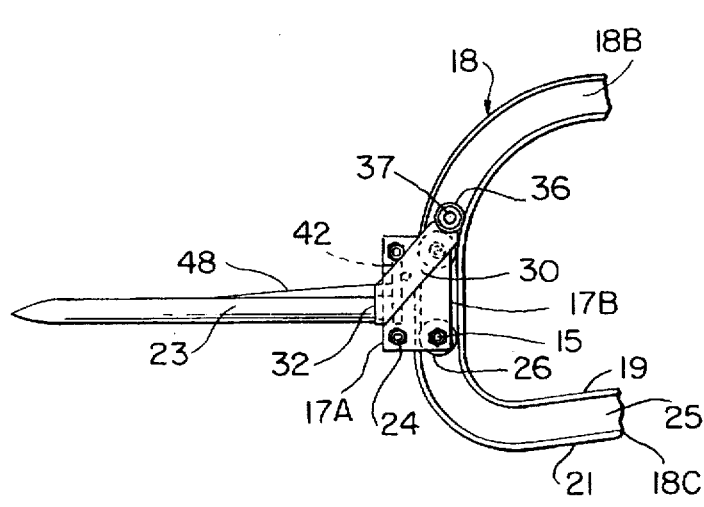
FIG. 7 is a side elevational view of the portion of the trailer shown in FIGS. 5 and 6, illustrating particularly the makeup of each U-shaped cam follower assembly for controlling the position of the I-beam car track.
Figure 8:
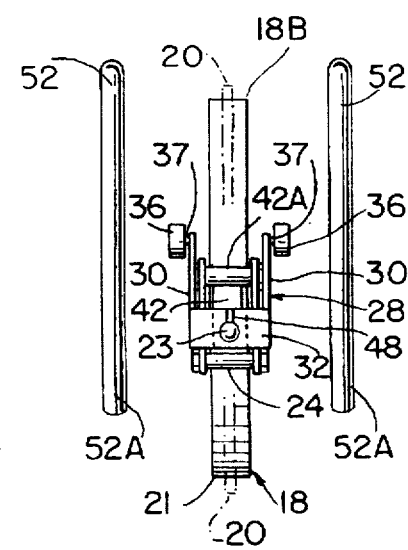
FIG. 8 is a front elevational view of the portion of the trailer of FIG. 7.

A hinged, spear mounting plate 32 of rectangular form, FIG. 6, having a width slightly less than the distance between the laterally opposed sidewalls 17 of each car 22 is hinged to each car 22. One of the transverse bolts 24 functions as a hinge pin passing through a cylindrical hinge 42A, integral with plate 42, at an upper end thereof, FIGS. 5, 6. The spear 23 for each car 22 is welded at its inner end to the face of hinged plate 42, adjacent its free end. A narrow reinforcing rib 48 extends approximately one half the length of the spear 23, tapering over its length and is also welded at one end to the plate 42. Each hinged plate 42 pivots about its hinge axis A, FIG. 6. In the illustrated embodiment, the hinged plate 42 is controlled so as to shift from a position as shown in FIGS. 7 and 8 parallel with hinge edge 17A to a position at right angles to that edge, FIG. 9, i.e., through approximately 90°. In this position, the spear 23 extends generally parallel to the longitudinal axis of the car 22. The orientation of each spear 23 relative to its car 22 is controlled through a U-shaped cam follower yoke indicated generally at 28. Yoke 28 may be formed of sheet metal and includes a transverse base 32 somewhat wider than the car 22. From base 32 extends oblique yoke arms 32 at opposite ends of the base. The cam follower rolls are mounted to respective yoke arms 30 at ends remote from the base 32 via axles 37, with the cam follower rolls to the outside of respective arms 30. The cam follower rolls 36 are free to rotate about their axes. Base 32 of the cam follower yoke 38 is apertured at 46 and configured to surround spear 23 and the reinforcing rib 48. The cam follower yoke 28 is fixed to the spear 23 for each car 22 so as to rotate with the spear 23 on plate 42 about the pivot axis of hinge 42A. The cam follower rolls determine the position of the hinged plate 42 and thus that of spear 23 for each car as it moves, for instance, in a loading mode from a position on the oblique, lower section 18C of the track through the vertical upright section 18A under control of two succeeding camming members, the first being camming bars 76 on opposite sides of the track 18 and the second being duplicate pairs of curved, spaced cam rails 78 defining arcuate camming slots 79 which extend from the lower end 76A of the camming bars to a transition point between the vertically upright section 18A of the track and the horizontal upper section of the track 18B. The opposite ends of the camming slots 79 flare outwardly to facilitate entry of cam follower rolls 36 into slots 79 and their passage out of those slots. The camming members therefore function in combination with the I-beam track 18 to modify the orientation of the cars 22 and their spear 23, respectively.

The automated operation of the apparatus can be appreciated from the sequence in position and movement of a given car 22 starting with its full line initial position within section 18C of the I-beam track 18, FIG. 9. FIG. 9 illustrates the sequence of loading a round hay bale B onto the upper surface of the open frame deck 16. In the full line position, the spear 23 of car 22 is forced into a position beneath and essentially parallel to edge 17A of the side plate 17 of car 22 since the cam follower rolls 36 on opposite cam follower yoke arms 30 are in contact with the lower face of camming bar 76 and thus maintained in that position over an extent of movement from right to left in the direction of the rear of the trailer 10. Thus, the hinged plate 42 is pivoted approximately 90° by cam follower yoke 28 from its normal in-line position with the edge 17A of the car sidewall 17. In FIG. 9 the roller chain 20 is not illustrated, however, it may be appreciated that by operation of motor M, FIGS. 1, 3, and with the chain 20 driven clockwise about sprocket 60, FIG. 1, the car 22 is driven to the left to the point where the cam follower rolls 36 of respective arms 30 of yoke 28 enter cam slots 79 defined by duplicate pairs of cam rails 78 on respective opposite sides of track 18. Due to the arrangement and spacing of the cam rails and the curvature of the vertical section 18A of the I-beam track 18, the orientation of the axis of car 22 changes from near horizontal to near vertical, while the spear 23 carried thereby is maintained generally horizontal as it rises from a position near but spaced from the ground as indicated in the dotted line sequence of the spear 23, the yoke 28 and the cam follower rolls 36. Once the spear 23 is at a proper vertical height aligned with the axis or center of the round hay bale B, the trailer 10 is driven rearwardly, in the direction of the bale B which rests on the ground G, and the bale B is impaled on spear 23. The car 22, at that point, moves over a curved transition portion of the rail leaving section 18A and entering the rear portion of section 18B. Since the bale B is impaled by the spear 23 on car 22, as shown in dotted lines in the sequence, the bale B changes its orientation from having its axis horizontal to one initially inclined, and then vertically upright at the third and last position for the bale B as indicated in dotted lines, FIG. 9, to the right and above the deck 16. The cam follower wheels move out of the cam slot 79, with the cam follower wheels at the second, oblique position of the bale B, FIG. 9, being free of restraint. Meanwhile, the hinged plate 42 has moved to its position in alignment with the side edge 17A of the sidewall plate 17 of car 22. By gravity effect, the weight of the bale B maintains the spear at right angles to the car axis during movement of the bales B, along the deck 16, forwardly in the direction of bale stop 54. The last impaled bale B, FIG. 1, is maintained in a tilted condition at the rear of the trailer, with its car 22 for that bale, FIG. 1, being at a curved transition point between sections 18A, 18B of the I-beam track 18. As bale B moves into a position to the top right, FIG. 9, the trailer 10 itself is driven in reverse by the prime mover while a succeeding car 22, in the direction of movement of the cars 22, is positioned so that its spear 23 is within the vertical section 18A of the track and at a predetermined position vertically from ground G may impale the center of a further round hay bale B, by backing the trailer 10 into the bale to impale the same.

A loaded trailer, such as that shown in FIG. 1, may then be moved from the production fields with the round hay bales B transported to a storage area, feed area or market. At a storage area, feed area or market, the bales B are unloaded in a reverse sequence to that described above with respect to FIG. 9 during loading. All of the actions are automatic, the change in orientation of the spear with respect to its car is effected automatically by cam controlled, cam follower operation pivoting of the pivot mounting plate 42 through approximately 90° of rotation. In unloading, the cars move into car storage positions as illustrated in FIG. 2. This is achieved by reverse counterclockwise rotation of the chain 20 by motor M, either hydraulically or electrically. A last car 22 in terms of direction of movement reversely to store the cars and to set up the trailer 10 for loading of additional bales from the production fields is left in position within the vertical section 18A of the I-beam track and with its spear 23 properly oriented above the ground G so as to spear the round hay bale B at its center.

As may be appreciated, at all times the bales B are securely impaled on the spears 23, whether during initial spearing to engage the bales B with the car carried spears 23, during the transition and orientation from a horizontal axis position on the ground to that a vertical upright position when the car driven bales are placed onto the top of open frame deck 16 and during conveyance across that deck in the direction of the upright load stop 54.

While the invention has been described by way of a preferred embodiment, it is to be understood that modifications and changes may be made thereto without departing from the scope of the invention as defined in the claims appended hereto.

What is claimed is:

1. A ground engaging, wheeled, round hay bale loading and transport trailer having a longitudinal axis parallel to the line of travel of said trailer, said trailer including an elongated chassis supporting a horizontal deck, a unitary looped track fixedly carried by said chassis, said track including at least an overlying horizontal first section extending from a rear of said deck towards a front thereof, an integral vertical second section at the rear of the deck extending downwardly from said overlying first section, and an integral underlying third section extending from the lower end of said vertical second section forwardly towards the front of said deck, a plurality of cars mounted on said track for movement along said track, means for selectively, bidirectionally driving said cars sequentially along said track between said first and second track sections and through said third section, a spear carried by each car and projectable outwardly from said car at a right angle to said track for impaling the center of round hay bales resting on the ground with the bales axes horizontal with a car carrying said spear positioned within said second track section and with the spear thereof projecting horizontally, rearwardly from said trailer, whereby after impalement, movement of said car with the impaled round hay bale from said second section onto said first section permits automatic spearing and loading of round hay bales in a row over the extent of the horizontal deck and with unloading of said round hay bales being effected by reverse movement of said cars sequentially along said track.

2. The trailer as claimed in claim 1, wherein said track comprises an endless loop.

3. The trailer as claimed in claim 1, wherein said track is of hair pin shape, with said, first, second and third sections forming an open right triangle, with an apex of said right triangle at the front of the deck.

4. The trailer as claimed in claim 1, wherein said track is a rolled I-beam having flat, radially inner and outer walls, wherein each of said cars is of parallelepiped construction including laterally opposed sidewalls spaced apart a distance in excess of the radially outer wall of said track, wherein at least one rotatable guide wheel is carried by each sidewall of said car on inside faces thereof, with said rotatable wheels of said car sidewalls positioned within cavities to opposite flat sides of the I-beam track and in contact with interior surfaces of said opposed walls of said I-beam, and wherein said cars include means for hingedly mounting a base of the spear to said car, thereby permitting said spear to move between a first position extending parallel to the longitudinal axis of the car and a second position perpendicular thereto and projecting radially outwardly of said car.

5. The trailer as claimed in claim 4, wherein said means for hingedly mounting each said spear at its base to a respective car comprises a hinged plate carried by said car on a portion of said car radially outward of said track and being hinged along one edge to said car, perpendicular to the longitudinal axis of said I-beam.

6. The trailer as claimed in claim 5, further comprising cam follower means fixed to said hinged plate and cam means fixed to said chassis and positioned in a path of said cam follower means, such that by contact of the cam follower means with said cam means said hinged plate shifts from said first position to said second position to facilitate storage of said cars below said third section of said track.

7. The trailer as claimed in claim 6, wherein said cam follower means comprises a U-shaped cam follower yoke having a base spanning across said car to opposite sides thereof, beyond said car sidewalls, said base is fixedly mounted to said spear adjacent to said hinged plate and said cam follower yoke comprises a pair of oblique arms extending outwardly of said base at opposite ends thereof along the side walls of the car, and said yoke arms have mounted thereto, at ends opposite said base, respective cam follower rolls for engagement with said cam means.

8. The trailer as claimed in claim 7, wherein said cam means further comprises dual sets of curved cam rails positioned on opposite sides of said track at a lower end of the third section and extending upwardly to a front of the vertical second track section defining a pair of cam slots for receiving said cam follower rolls to maintain said spears horizontally during transition of said car from the lower end of said third track section into and within said track second section.

9. The trailer as claimed in claim 1, wherein said means for driving said cars sequentially, selectively, and bidirectionally in sequence along said track comprises an endless chain mounted to an outer periphery of said looped track, and said trailer further comprises a sprocket mounted to said chassis and operatively engaging said chain and bidirectional motor means operatively coupled to said sprocket for rotating said sprocket bidirectionally about its axis.

10. The trailer as claimed in claim 9, wherein said track comprises a hair pin shaped track, said first and third track sections intersect at an apex adjacent to the front of the trailer, and wherein said sprocket is mounted to said chassis adjacent said apex, with said endless chain leaved thereabout.

* * * * *